United States Patent
Kislinger et al.

(10) Patent No.: US 10,598,032 B2
(45) Date of Patent: Mar. 24, 2020

(54) GAS TURBINE GUIDE VANE ELEMENT

(71) Applicant: MTU Aero Engines AG, Munich (DE)

(72) Inventors: Bernd Kislinger, Reisgang (DE); Norbert Huebner, Dachau (DE)

(73) Assignee: MTU Aero Engines AG, Munich (DE)

( * ) Notice: Subject to any disclaimer, the term of this patent is extended or adjusted under 35 U.S.C. 154(b) by 818 days.

(21) Appl. No.: 15/143,979

(22) Filed: May 2, 2016

(65) Prior Publication Data

US 2016/0326895 A1 Nov. 10, 2016

(30) Foreign Application Priority Data

May 8, 2015 (DE) .................. 10 2015 208 572

(51) Int. Cl.
  *F01D 9/04* (2006.01)
  *F01D 11/00* (2006.01)
  *F01D 5/14* (2006.01)

(52) U.S. Cl.
  CPC ............. *F01D 9/041* (2013.01); *F01D 5/143* (2013.01); *F01D 5/145* (2013.01); *F01D 11/005* (2013.01); *F05D 2220/32* (2013.01); *F05D 2240/12* (2013.01); *F05D 2240/80* (2013.01); *F05D 2250/184* (2013.01); *F05D 2250/711* (2013.01); *Y02T 50/673* (2013.01)

(58) Field of Classification Search
  CPC .......... F01D 9/041; F01D 9/042; F01D 5/141; F01D 5/143; F01D 5/145; F01D 11/005; F05D 2240/12; F05D 2240/80; F05D 2240/81; F05D 2250/184; F05D 2250/712
  USPC ........................................................ 415/914
  See application file for complete search history.

(56) References Cited

U.S. PATENT DOCUMENTS

| | | | |
|---|---|---|---|
| 4,767,260 A * | 8/1988 | Clevenger | F01D 9/041 415/115 |
| 5,167,485 A | 12/1992 | Starkweather | |
| 2009/0162193 A1 | 6/2009 | Mariotti et al. | |
| 2013/0004315 A1 | 1/2013 | Beeck et al. | |
| 2013/0004331 A1 | 1/2013 | Beeck | |
| 2013/0251520 A1 | 9/2013 | Barr et al. | |
| 2016/0146031 A1* | 5/2016 | Ahmad | F01D 11/005 415/208.1 |
| 2016/0222807 A1* | 8/2016 | Liebl | F01D 9/04 |

FOREIGN PATENT DOCUMENTS

| | | |
|---|---|---|
| EP | 2261462 A1 | 2/2010 |
| EP | 2505851 A2 | 10/2012 |
| EP | 2547487 A1 | 1/2013 |
| EP | 2586993 A2 | 5/2013 |
| EP | 2730745 A1 | 5/2014 |
| WO | 2014130332 A1 | 8/2014 |

* cited by examiner

*Primary Examiner* — Christopher Verdier
(74) *Attorney, Agent, or Firm* — Barlow, Josephs & Holmes, Ltd.

(57) ABSTRACT

A guide vane element for a gas turbine, the guide vane element having a first guide vane, a second guide vane distanced by one division in the peripheral direction, and at least one band joining these guide vanes, in particular, a radially inner band and/or a radially outer band, wherein at least one band joining these guide vanes has a vane-side surface having a contouring and a first front side in the peripheral direction having a groove, which is particularly straight in the axial direction, for the uptake of a sealing element.

19 Claims, 1 Drawing Sheet

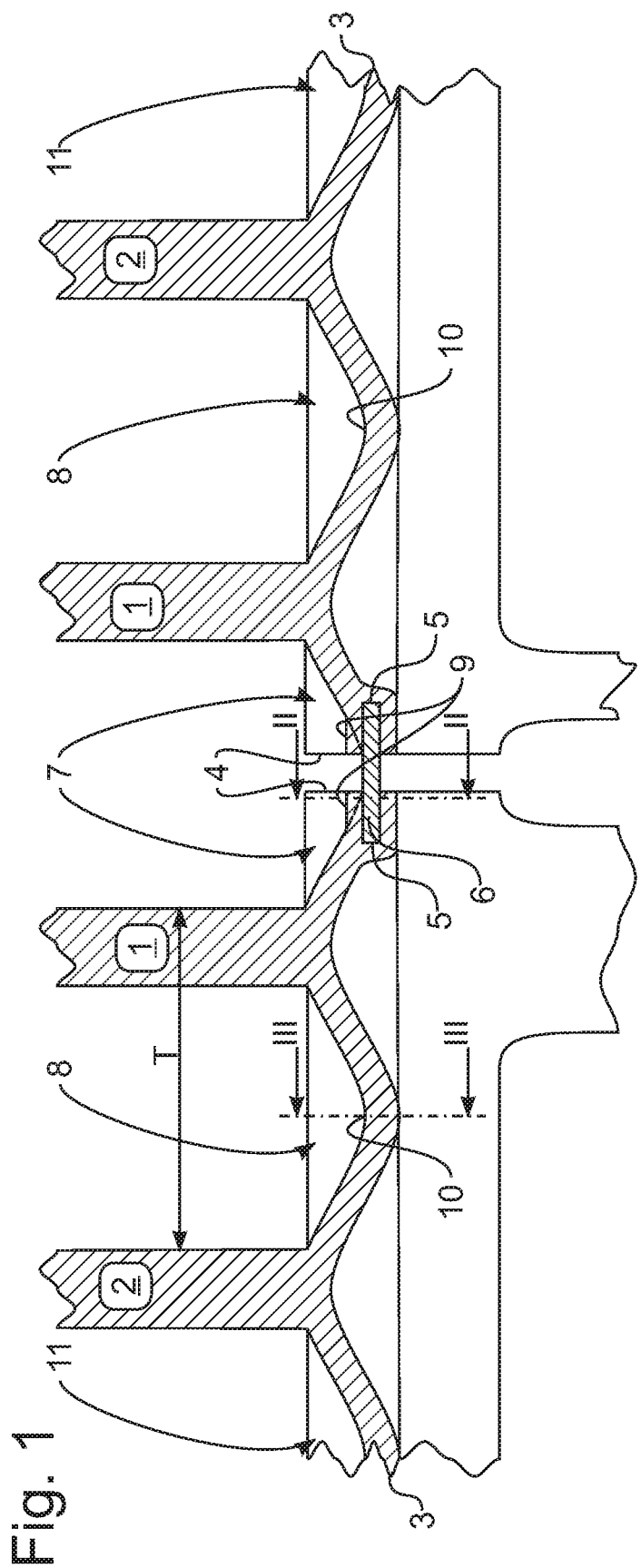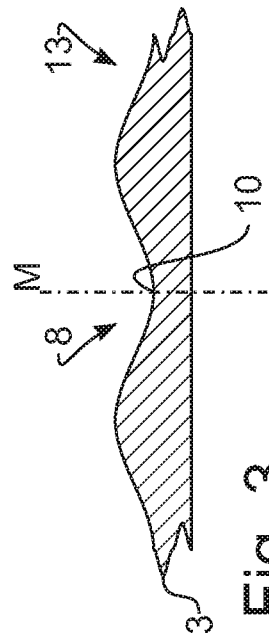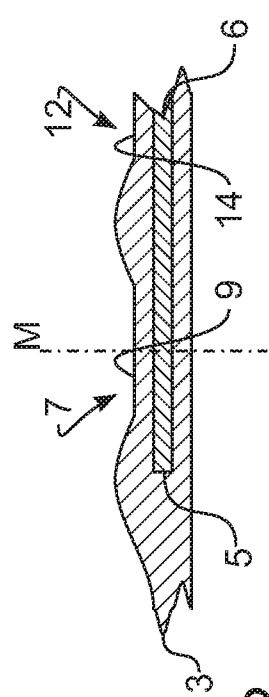

GAS TURBINE GUIDE VANE ELEMENT

BACKGROUND OF THE INVENTION

The present invention relates to a guide vane element for a gas turbine, a guide vane element assembly having two guide vane elements, as well as a gas turbine having the guide vane element.

Guide vane elements are known from in-house company experience, in particular guide vane clusters with a so-called annular space contouring, i.e., a contouring of radially inner and/or outer bands joining the guide vanes of the guide vane elements, in order to improve the efficiency of a guide vane grid or cascade having the guide vane elements.

For sealing gaps between opposite-lying front sides of adjacent guide vane elements in the peripheral direction, sealing elements that engage in grooves in these front sides are also known.

If the annular space contour has a local depression or a valley in the region of such a groove, the wall thickness of the band will be enlarged beforehand overall in the radial direction away from the guide vanes, in order to maintain a sufficient residual wall thickness of the band in the region of the base of the local depression.

Disadvantageously, this increases weight and/or radial structural height.

SUMMARY OF THE INVENTION

An object of an embodiment of the present invention is to improve a gas turbine.

This object is achieved by a guide vane element of the present invention. The present invention also provides for a guide vane element assembly or a gas turbine having the guide vane element. Advantageous embodiments of the invention are discussed in detail below.

According to an aspect of the present invention, a guide vane element for a gas turbine, particularly a guide vane element of a gas turbine, has a first guide vane, a second guide vane distanced by an interval or division in the peripheral direction, and at least one band joining these guide vanes.

In one embodiment, the band can be a radially inner band. In another embodiment, the band can likewise be a radial outer band. In one embodiment, if the guide vane element has a radially inner band and a radially outer band, then in one embodiment, only the radially inner band, only the radially outer band, or both the radially inner band and the radially outer band can be designed in the way described below.

The band, or at least one of the bands, has a surface on the vane side, a radially inner band thus having a radially outer surface, a radially outer band correspondingly having a radially inner surface, with an (annular space) contouring, and a first front side in the peripheral direction having a groove in which a sealing element is taken up or which is provided or supplied for this purpose.

In one embodiment, the groove is straight, at least substantially, in the axial and/or peripheral direction, and/or has a constant radial height, at least substantially, in the axial and/or peripheral direction.

Contouring is presently understood, in particular, as a radial distance of the surface of the guide vane element that varies in the peripheral and/or axial direction(s) in an (its) installed position relative to an axis of rotation of the gas turbine, in particular, involving one or more local depressions and/or elevations when compared to a cylinder-shaped reference surface.

Correspondingly, the vane-side surface or contouring of the radially inner and/or of the radially outer band between the first guide vane next to the front side and the front side has a first local depression that lies radially opposite the groove. In particular, a projection of the groove in the radial direction can lie partially or completely within the (first local) depression lying radially opposite, in particular inside its base, which will be explained below, and/or a projection of the (first local) depression lying radially opposite the groove, in particular at least its base, which will be explained below, can lie partially or completely inside the groove in the radial direction. In other words, the groove and the (first local) depression lying radially opposite to it, in particular its base, which will be explained below, cover one another, at least partially, when viewed in the radial direction.

The surface or contouring has a second local depression between the first and second guide vanes, this depression being distanced from the first depression in the peripheral direction by the interval or division and having the same axial position as the first depression in the axial direction.

Two depressions, in particular, are distanced by the division in the peripheral direction in the sense of the present invention, as long as their distance in the peripheral direction deviates from the division by at most 10%, in particular at most 5%, in particular at most 1%, in particular at most 0.1%. Correspondingly, in the sense of the present invention, in particular, two depressions have the same axial position in the axial direction, as long as their distance in the axial direction amounts to at most 10%, in particular at most 5%, in particular at most 1%, in particular at most 0.1%, of an axial width of the band that is a minimum, maximum, or average width, in particular.

A distance between two depressions in the peripheral direction can be, in particular, the distance between the frontmost or backmost point of intersection, in the peripheral direction, of a virtual or reference cylinder having the two depressions, whose cylindrical axis is aligned with the axis of rotation of the gas turbine. A distance between two depressions in the axial direction correspondingly can be, in particular, the distance between the frontmost or backmost point of intersection, in the axial direction, of the virtual or reference cylinder having the two depressions. In other words, in order to determine a distance in the sense of the present invention, in particular with respect to the evaluation of a spacing in the peripheral direction by the division and/or the same axial position in the axial direction, in one embodiment, a virtual or reference cylinder having the two depressions, whose cylinder axis is aligned with the axis of rotation of the gas turbine, determines (virtually) section curves or height lines of the depressions at the same radial height; the frontmost or backmost point in the peripheral or axial direction is determined each time on these section curves or height lines; and the distance between these two frontmost or backmost points from one another in the peripheral or axial direction is determined as the distance between the two depressions, whereby the radial height or the radius of the reference cylinder can lie, in particular, at a half radial height of one of the two depressions or at the height of the base of one of the two depressions.

In other words, the second local depression, when compared to the first local depression, is offset, at least substantially, (only) by the division, and in one embodiment it corresponds, at least substantially, to the first local depression in its outer dimension and/or outer edge. As long as the first depression, in particular its base, bounds the front side, in other words, is "cut off" by the latter, in one embodiment, the corresponding part of the second local depression corresponds to the first local depression in outer dimension and/or outer edge, at least substantially. In other words, the outer edge of the first depression can be brought into alignment, at least substantially, with the outer edge of the second depression or a corresponding partial region thereof by offsetting by the division.

According to one aspect of the present invention, the first depression has a base, which is particularly planar, and which encloses an angle relative to the base, which amounts to at most ±15°, in particular at most ±10°, in particular at most ±5°, particularly, at least substantially, parallel to the particularly straight groove.

Additionally or alternatively, the particularly planar base of the first depression is offset relative to the guide vanes when compared to the base of the particularly concave second depression in the radial direction relative to the guide vanes.

In other words, in one embodiment, at least one first local depression or a valley of an annular space contouring that is in particular periodic and that lies radially opposite the depression or valley of the groove, is partially "filled".

More material is available thereby on the vane side in the region of the depression, so that the groove is offset in the radial direction relative to the guide vanes when compared to previous embodiments, and thus weight and/or radial structural space can be reduced particularly advantageously.

A base of a local depression is presently particularly understood as that region of the depression that has the greatest distance from the guide vanes in the radial direction: for a depression in a radially outer surface of a radially inner band of the guide vane element, corresponding to that region of the depression having a minimum distance to the axis of rotation of the gas turbine in the radial direction in an (its) installed position; and for a depression in a radially inner surface of a radially outer band of the guide vane element, corresponding to that region of the depression having a maximum distance to the axis of rotation of the gas turbine in the radial direction in an (its) installed position.

The first depression, in particular its base, is adjacent to the (first) front side in one embodiment. Therefore, in particular, a depression of an annular space contouring can be or will be formed in common by the first depression of a guide vane element and a local depression of an adjacent guide vane element bounding it in the peripheral direction.

Likewise, in another embodiment, the first depression, in particular its base, can be distanced from the (first) front side in the peripheral direction. Therefore, in particular, a local depression of an annular space contouring can be or will be formed only by the first depression of a guide vane element.

In one embodiment, in addition to the first and second guide vanes, the guide vane element has no other, one other, or at least two other guide vanes distanced in the peripheral direction, in particular by the division. In one embodiment, in addition to the first and second guide vanes, the guide vane element has at most 8, in particular at most 6, other guide vanes distanced in the peripheral direction, in particular by the division.

In one embodiment, between the second guide vane and the other guide vane(s) adjacent to it, the surface or contouring has another local depression, which is distanced from the second depression in the peripheral direction by the division, has the same axial position as the second depression in the axial direction, and whose particularly concave base, when compared to the base of the second depression, is offset in the radial direction by at most 5%, in particular at most 1%, in particular at most 0.1%, of a particularly minimum, maximum, or average radial wall thickness of the band, in particular in the region of the base, and/or at most 1 mm, in particular by at most 0.1 mm. In other words, when compared with the second local depression, the additional local depression is offset, at least substantially, (only) by the division and corresponds in dimension and/or shape, at least substantially, to the second local depression.

In an enhancement, the contouring having the division is periodic or has local depressions and/or elevations that are distanced by the division in the peripheral direction.

In one embodiment, when compared with the base of the second depression, the base of the first depression is offset in the radial direction by at least 1%, in particular at least 2%, in particular at least 5%, of a particularly minimum, maximum or average radial wall thickness of the band, in particular in the region of the base, and/or at least 1 mm, in particular by at least 2 mm, in particular by at least 5 mm.

In one embodiment, between the first guide vane and the front side, the surface or contouring has one or more other first local depression(s) laying radially opposite the groove, and, between the first and second guide vanes, it has (in each case) another second local depression that is distanced by the division from the other first depression in the peripheral direction, but has the same axial position as the other first depression in the axial direction, wherein the one or more of these other first depression(s) (in each case) has or have a particularly planar base, which is not offset, when compared to the base of the first depression, in the radial direction or relative to the guide vanes. In other words, the first local depression can be the radially deepest depression that lies radially opposite the groove, or its base is covered at least partially by the groove when viewed in the radial direction.

In one embodiment, the base of the other first depression or of one or more of the other first depression(s) encloses an angle with the groove (in each case) that amounts to at most ±15°, in particular at most ±10°, in particular at most ±5°, and is in particular at least substantially parallel to the particularly straight groove.

Additionally or alternatively, the particularly planar base of the other first depression or of one or more of these other first depression(s) is offset in the radial direction relative to the guide vanes, when compared to the base of the other particularly concave second depression relative to the guide vanes.

In other words, in one embodiment, in addition to the first local depression, one or more of the other first local depressions that lie radially opposite the groove, in particular its base, are partially "filled". In another embodiment, in contrast, only the (radially deepest) first local depression is partially "filled".

In one embodiment, the contouring between the first guide vane and the front side can have one or more additional local depressions whose base is not covered by the groove when viewed in the radial direction, and/or that is (are) deeper than the first depression.

In one embodiment, one or more of the depression(s), thus in particular the first local depression, the second local depression, one or more other first local depression(s), and/or one or more other second local depression(s), are distanced in the axial direction from one or both front side(s) in the axial direction of the respective band that has this (these) depression(s). Additionally or alternatively, in one embodiment, one or more of the depression(s), thus, in particular, the first local depression, the second local depression, one or more other first local depression(s), and/or one or more other second local depression(s) are distanced in the peripheral direction from one or two adjacent guide vane(s) of the guide vane element in the peripheral direction.

In one embodiment, a particularly minimum, maximum, or average extent of one of the depressions or of its planar base, thus, in particular of the first local depression, of the second local depression, of one or more other first local depression(s) and/or of one or more other second local depression(s), in the axial direction, amounts to at least 5%, in particular at least 10%, and/or at most 75%, in particular at most 50%, in particular at most 25%, of the particularly minimum, maximum, or average axial width of the band. Additionally or alternatively, in one embodiment, a particularly minimum, maximum, or average extent of one of the depressions or of its planar base, thus, in particular of the first local depression, of the second local depression, of one or more other first local depression(s) and/or of one or more other second local depression(s), in the peripheral direction, amounts to at least 5%, in particular at least 10%, and/or at most 75%, in particular at most 50%, in particular at most 25%, of the division.

In one embodiment, a surface of a particularly planar base of at least a first depression amounts to at least 1%, in particular at least 2%, in particular at least 5% of a surface of the band between the first and second guide vanes, wherein, in the sense of the present invention, the surface of the band between the first and second guide vanes can be, in particular, the surface between skeletal or profile (center) lines of the first and second guide vanes. For simplification, in the sense of the present invention, in one embodiment, the surface of the band between the first and second guide vanes can be or will be determined by the product of the division with the particularly average, maximum, or minimum axial width of the band. Correspondingly, in one embodiment, a surface of a particularly planar base of at least one first depression amounts to at least 1%, in particular at least 2%, in particular at least 5% of a product of the division with the particularly average, maximum, or minimum axial width of the band.

In one embodiment, the guide vanes and the radially inner band joining these guide vanes, and/or the radially outer band joining these guide vanes are or will be manufactured in an integral manner with one another, in particular preformed, in particular cast, or, in particular joined together cohesively, particularly welded. Additionally or alternatively, the band or the bands is (are) or will be (manufactured) in one part or in one piece.

According to one aspect of the present invention, a guide vane element assembly has a (first) guide vane element described here and another guide vane element with a front side that has a groove, and the first front side of the one (first) guide vane element lies opposite in the peripheral direction, wherein a sealing element of the guide vane element assembly engages in the grooves in these front sides lying opposite one another.

In one embodiment, the other guide vane element can also be a (second) of the guide vane elements described here; its front side lying opposite the first front side of the one (first) guide vane element is its first front side. Likewise, the other guide vane element can also be a guide vane element different from a guide vane element described here.

As has already been explained in the preceding, a depression of an annular space contouring thus can be or will be formed jointly by the first depression of the one (first) guide vane element and the first depression of the other (second) guide vane element. Likewise, a local depression of an annular space contouring can be or will be formed only by the first depression of the one (first) guide vane element.

BRIEF DESCRIPTION OF THE DRAWING FIGURES

Other advantageous enhancements of the present invention can be taken from the claims and the following description of preferred embodiments. For this purpose and partially schematized:

FIG. 1 shows an axial section through a portion of a guide vane element assembly of a gas turbine having two guide vane elements according to one embodiment of the present invention;

FIG. 2 shows a portion of a meridian section along line II-II in FIG. 1; and

FIG. 3 shows a portion of a meridian section along line in FIG. 1.

DESCRIPTION OF THE INVENTION

FIG. 1 shows an axial section through a portion of a guide vane element assembly of a gas turbine having two guide vane elements according to one embodiment of the present invention.

The two guide vane elements are identical and are thus described jointly in the following.

They each have a first guide vane 1, a second guide vane 2 distanced by one division T in the peripheral direction, and a radially inner band 3 joining these guide vanes 1, 2 in each case. The guide vanes can additionally also be joined by a radially outer band (not shown), which can be designed in the way described below, in addition to the radially inner band 3 or instead of this band.

The bands 3 each have a vane-side surface (top in FIG. 1) having a roughly sinusoidal contouring, given only by way of example in the exemplary embodiment, and a first front side 4 in the peripheral direction (horizontal in FIG. 1) having a groove in which a sealing element 6 is taken up.

The groove 5 is straight in the axial direction (perpendicular to the plane of the drawing of FIG. 1) and in the peripheral direction, and has a constant radial height in the axial and peripheral directions.

Between the first guide vane 1 next to the front side and the front side 4, the vane-side surface or contouring has a first local depression 7 that lies radially opposite the groove 5 (vertical in FIG. 1).

Further, between the first and second guide vanes 1, 2, it has a second local depression 8 that is distanced by the division T from the first depression 7 in the peripheral direction and that is aligned with the first depression 7, when viewed in the peripheral direction, so that it has the same axial position as the first depression 7 in the axial direction. This can be recognized particularly in the overall view of FIGS. 2, 3, in which a central plane M of the guide vane element is indicated by a dot-dash line perpendicular to the axis of rotation of the gas turbine. The second local depression 8 is thus offset only by the division T when compared with the first local depression 7; it or a corresponding part of the second local depression 8 corresponds in outer dimension and outer edge to the first local depression.

The first depression 7 has a planar base 9 that is parallel to the groove 5.

Additionally, the planar base 9 of the first depression 7, when compared to a concave base 10 of the second depression 8 relative to guide vanes 1, 2, is offset in the radial direction relative to the guide vanes (toward the top in FIGS.

1-3), as can be recognized, in particular, in FIG. 1 as well as the overall views of FIGS. 2, 3.

In other words, the first local depression 7 of a periodic annular space contouring that lies radially opposite the groove 5 is partially "filled". For clarification, in FIG. 1, the ("unfilled") surface corresponding to the second depression 8 is also characterized by a dot-dash line.

The base 9 of the first depression 7 is adjacent each time to the first front side 4, so that a depression of the annular space contouring of the guide vane element assembly is formed in common by the first depressions 7 of the two guide vane elements.

In addition to the first and second guide vanes 1, 2, the guide vane elements can have additional guide vanes distanced by the division T in the peripheral direction (not shown).

The surface or contouring then has, in particular, between the second guide vane 2 and the additional guide vane adjacent to the latter, another local depression 11, which is distanced from the second depression 8 by the division T in the peripheral direction, and which is aligned with the second depression 8, when viewed in the peripheral direction, and whose concave base in the radial direction lies at the same height as the base 10 of the second depression. In other words, the additional local depression 11, when compared with the second local depression 8, is offset only by the division T and corresponds in dimension and shape to the second local depression 8.

In general, the contouring with the division T is periodic or has local depressions 7, 8, 11 and elevations distanced by the division T in the peripheral direction.

As can be recognized, in particular, in the section of FIG. 2, the surface or contouring has another first local depression 12 between the first guide vane 1 and the front side 4 and has another second local depression 13 offset thereto by the division T between the first and second guide vanes 1, 2.

This other first depression 12 also has a planar base 14; the latter is not offset in the radial direction when compared to the base 9 of the first depression 7. Thus, the first local depression 7 (as well as also the other first local depression 12, whose base 14 lies at the same radial height as the base 9 of the first local depression 7, in each case) is a radially deepest depression that lies opposite the groove 5.

As can also be recognized in FIG. 2, the contouring between the first guide vane 1 and the front side 4 can have additional local depressions that are deeper than the first depression 7, but do not lie radially opposite the groove 5 or their base is not covered by the groove 5 in the radial direction.

Also, the base 14 of the other first depression 12 is parallel to the groove 5 and, when compared to the concave base of the other second depression 13 relative to the guide vanes, is offset in the radial direction relative to the guide vanes (toward the top in FIG. 2).

As can be further recognized in FIG. 2, the first local depression 7 is distanced from both front sides in the axial direction (left, right in FIG. 2) of the band 3.

Although exemplary embodiments were explained in the preceding description, it shall be noted that a plurality of modifications is possible. In addition, it shall be noted that the exemplary embodiments only involve examples that in no way shall limit the scope of protection, the applications and the construction. Rather, a guide is given to the person skilled in the art by the preceding description for implementing at least one exemplary embodiment, whereby diverse changes, particularly with respect to the function and arrangement of the described components, can be carried out without departing from the scope of protection, as it results from the claims and combinations of features equivalent to these.

What is claimed is:

1. A guide vane element for a gas turbine comprising,
a first guide vane,
a second guide vane distanced by one division in the peripheral direction from the first guide vane, and
at least one band joining these guide vanes, wherein the at least one band joins the first and second guide vanes and the at least one band has a vane-side surface with a contouring and a first front side in the peripheral direction having a groove, which is straight in the axial direction, for uptake of a sealing element,
wherein the contouring has a first local depression lying radially opposite to the groove between the first guide vane next to the front side and the front side, and a second local depression between the first and second guide vanes, the second depression being distanced from the first depression by the division in the peripheral direction and having the same axial position as the first depression in the axial direction, wherein the first depression has a base, which is planar, and which is angularly offset an angle in the range of ±15° with respect to the groove; and/or is offset in the radial direction relative to the guide vanes, when compared with a concave base, of the second depression,
wherein at least one and/or at most 8 additional guide vanes are distanced by the division in the peripheral direction, and
wherein the contouring between the second guide vane and one of the at least one and/or at most 8 additional guide vanes adjacent to the second guide vane has another local depression that is distanced by the division from the second depression in the peripheral direction, has the same axial position as the second depression in the axial direction, and has an additional base which is concave, is offset in the radial direction, when compared to the base of the second depression by at most 5% of a radial wall thickness of the at least one band, and/or offset in the radial direction compared to the base of the second depression by at most 1 mm.

2. The guide vane element according to claim 1, wherein the first depression, at its base, bounds the front side or is distanced from the latter in the peripheral direction.

3. The guide vane element according to claim 1, wherein the base of the first depression, when compared to the base of the second depression, is offset in the radial direction by at least 1% of a radial wall thickness of the at least one band, and/or offset in the radial direction compared to the base of the second depression by at least 1 mm.

4. The guide vane element according to claim 1, wherein at least one of the first and second depressions is distanced from the first front side of the at least one band having the first local depression in the axial direction and/or at least one adjacent guide vane of the guide vane element in the peripheral direction.

5. The guide vane element according to claim 1, wherein an extent or dimension of at least one of the depressions or its planar base in the axial direction amounts to at least 5% and/or at most 75% of the axial width of the at least one band, and/or in the peripheral direction amounts to at least 5% and/or at most 75% of the division.

6. The guide vane element according to claim 1, wherein a surface of the planar base of the first depression amounts to at least 1% of a surface of the at least one band between the first and second guide vanes.

7. The guide vane element according to claim 1, wherein the guide vanes and the at least one band joining these guide vanes are manufactured integrally with one another, are pre-formed, or are joined together cohesively.

8. The guide vane element according to claim 1, wherein one or more of the guide vane element is configured and arranged for use in an aircraft engine gas turbine.

9. A guide vane element for a gas turbine comprising,
a first guide vane,
a second guide vane distanced by one division in the peripheral direction from the first guide vane, and
at least one band joining these guide vanes, wherein the at least one band joins the first and second guide vanes and the at least one band has a vane-side surface with a contouring and a first front side in the peripheral direction having a groove, which is straight in the axial direction, for uptake of a sealing element,
wherein the contouring has a first local depression lying radially opposite to the groove between the first guide vane next to the front side and the front side, and a second local depression between the first and second guide vanes, the second depression being distanced from the first depression by the division in the peripheral direction and having the same axial position as the first depression in the axial direction, wherein the first depression has a base, which is planar, and which is angularly offset an angle in the range of ±15° with respect to the groove; and/or is offset in the radial direction relative to the guide vanes, when compared with a concave base, of the second depression, and
wherein the contouring between the first guide vane and the front side has at least one other first local depression lying radially opposite the groove, and has another second local depression between the first and second guide vanes, the another second local depression being distanced from the other first depression by the division in the peripheral direction, and having the same axial position as the other first depression in the axial direction, wherein the other first depression has a base, which is planar, and which, when compared to the base of the first depression, is not offset in the radial direction, or is not offset relative to the guide vanes.

10. The guide vane element according to claim 9, wherein the base of the other first depression encloses an angle that amounts to at most ±15° with the groove, and/or when compared to a concave base of the other second depression is offset in the radial direction relative to the guide vanes.

11. The guide vane element according to claim 9, wherein a first guide vane element and a second guide vane element are provided to provide a guide vane assembly, wherein the first front side of the first guide vane element lies opposite a front side of the second guide vane element having a groove in the peripheral direction, and the sealing element engages in the grooves in the front sides thereof lying opposite one another.

12. The guide vane element according to claim 11, wherein the second guide vane element has its front side lying opposite the first front side of the first guide vane element.

13. The guide vane element according to claim 9, wherein the first depression, at its base, bounds the front side or is distanced from the latter in the peripheral direction.

14. The guide vane element according to claim 9, wherein the base of the first depression, when compared to the base of the second depression, is offset in the radial direction by at least 1% of a radial wall thickness of the at least one band, and/or offset in the radial direction compared to the base of the second depression by at least 1 mm.

15. The guide vane element according to claim 9, wherein at least one of the first and second depressions is distanced from the first front side of the at least one band having the first local depression in the axial direction and/or at least one adjacent guide vane of the guide vane element in the peripheral direction.

16. The guide vane element according to claim 9, wherein an extent or dimension of at least one of the depressions or its planar base in the axial direction amounts to at least 5% and/or at most 75% of the axial width of the at least one band, and/or in the peripheral direction amounts to at least 5% and/or at most 75% of the division.

17. The guide vane element according to claim 9, wherein a surface of the planar base of the first depression amounts to at least 1% of a surface of the at least one band between the first and second guide vanes.

18. The guide vane element according to claim 9, wherein the guide vanes and the at least one band joining these guide vanes are manufactured integrally with one another, are pre-formed, or are joined together cohesively.

19. The guide vane element according to claim 9, wherein one or more of the guide vane element is configured and arranged for use in an aircraft engine gas turbine.

* * * * *